US005733048A

United States Patent [19]
El-Ibiary et al.

[11] Patent Number: 5,733,048
[45] Date of Patent: Mar. 31, 1998

[54] BEARING SYSTEM INCLUDING LUBRICANT CIRCULATION APPARATUS

[75] Inventors: Yehia El-Ibiary; Maurice J. D'Hoore, both of Simpsonville, S.C.

[73] Assignee: Reliance Electric Industrial Company, Cleveland, Ohio

[21] Appl. No.: 689,121

[22] Filed: Jul. 29, 1996

[51] Int. Cl.$^6$ .................................................. F16C 33/66
[52] U.S. Cl. .......................................... 384/399; 384/406
[58] Field of Search ................................... 384/400, 406, 384/100, 398, 399

[56] References Cited

U.S. PATENT DOCUMENTS

| | | | |
|---|---|---|---|
| 1,588,251 | 6/1926 | McNab | 384/444 |
| 4,699,575 | 10/1987 | Geisel et al. | 384/400 |
| 4,898,262 | 2/1990 | Gorodissky et al. | 384/400 |

OTHER PUBLICATIONS

Brochure entitled: "Dodge Circulating Oil Systems For Dodge Sleeveoil Hydrodynamic Bearing Systems," published by Reliance Electric Company, Greenville, South Carolina, dated 1993.

*Primary Examiner*—Lenard A. Footland
*Attorney, Agent, or Firm*—Craig N. Killen; John M. Miller; John J. Horn

[57] ABSTRACT

A bearing system includes a lubricant circulation apparatus to provide a continuous supply of lubricant fluid to a bearing device. The bearing device may be a hydrodynamic sleeve bearing having a bearing housing defining a sump for maintaining lubricant fluid therein. An oil ring may be situated about the mechanical shaft supported by the bearing device to deposit oil on top of the shaft during rotation. In addition, a bearing inlet is defined at a location radially above the shaft, with a bearing outlet being defined at a location radially below. The bearing outlet is in fluid communication with a reservoir of the lubricant circulation apparatus. A pump communicates with the reservoir to draw lubricant fluid therefrom and deliver it to the bearing inlet. Preferably, the pump draws lubricant fluid from the reservoir at a rate greater than can be passed through the bearing housing. In this case, a diverter mechanism, which may comprise a relief valve and a needle valve, may be provided to divert an excess flow from the pump back to the reservoir. A filter may be provided to remove impurities from the lubricant fluid prior to being pumped to the bearing housing. A pressure gauge may also be provided to indicate pressure in the fluid line at a location operatively behind the filter.

10 Claims, 3 Drawing Sheets

BEARING SYSTEM INCLUDING LUBRICANT CIRCULATION APPARATUS

BACKGROUND OF THE INVENTION

The present invention relates generally to the art of bearings utilized to facilitate shaft rotation. More particularly, the invention relates to a bearing system which includes a compact lubricant circulation apparatus to provide a continuous supply of lubricant fluid.

Depending on its construction, a particular bearing device will generally fall within one of several broad categories. One such category is the hydrodynamic sleeve bearing. Unlike bearing devices that utilize rotatable bearing elements (such as ball bearings or tapered roller bearings), hydrodynamic sleeve bearings are configured so that the shaft rides on a thin film of lubricant fluid. In such bearings, the shaft extends through a sleeve lined with babbitt or other suitable anti-friction material. Typically, the bearing further includes an oil ring to supply lubricant fluid from a sump defined in the bearing housing to the top of the shaft.

Generally, the use of an oil ring in a hydrodynamic sleeve bearing is effective at maintaining the lubricant film. In certain situations, however, it may be desirable to supplement the lubrication provided by the oil ring. For example, some fluid may inevitably escape the bearing housing, despite seals and the like provided to prevent this from occurring. When leakage occurs, additional fluid must be added to the housing sump. Often, adding lubricant directly to the bearing housing will be difficult in operation due to the location or manner in which the bearing device is installed. In addition, a "leaky" bearing will require frequent replenishment of the lubricant supply due to the relatively small capacity of the sump. The lubricant within the sump can also become contaminated, resulting in a general degradation of bearing performance.

SUMMARY OF THE INVENTION

The present invention recognizes and addresses the foregoing disadvantages, and others, of prior art constructions and methods. Accordingly, it is an object of the present invention to provide an improved bearing system for facilitating rotation of a mechanical shaft.

It is a further object of the present invention to provide an improved bearing system which continually supplies lubricant fluid to a bearing device.

It is a more particular object of the present invention to provide an improved bearing system which continually supplies filtered lubricant fluid to a bearing device.

It is also an object of the present invention to provide a compact lubrication system for use with a hydrodynamic sleeve bearing.

It is a further object of the present invention to provide a method of providing lubricant fluid to a hydrodynamic sleeve bearing.

Some of these objects are achieved by a bearing system for facilitating rotation of a mechanical shaft. The system comprises a bearing device, such as a hydrodynamic sleeve bearing, having a housing defining a bore therein for receipt of the shaft. The bearing device is operative to support the shaft during rotation thereof. The bearing housing further defines a sump for maintaining a lubricant fluid therein. A bearing inlet and a bearing outlet are also defined in the housing, permitting flow of lubricant fluid through the bearing housing at a predetermined flow rate.

A reservoir is also provided in fluid communication with the bearing outlet such that the lubricant fluid will flow from the sump to the reservoir. The reservoir is configured to maintain therein a predetermined quantity of lubricant fluid. The reservoir may have a sight gauge mounted thereon to indicate a level of lubricant fluid maintained therein.

A pump having a pump housing defining a pump inlet is provided in fluid communication with the reservoir. A pump outlet of the pump housing is connected in fluid communication with the sump. The pump is operative to draw lubricant fluid through the pump housing at a pump rate exceeding the predetermined rate of flow through the bearing housing. A flow diverter valve directs excess flow from the pump exceeding the predetermined flow rate through the bearing housing.

In presently preferred embodiments, the bearing system further comprises a filter device operatively situated between the pump outlet and the sump to remove impurities from the lubricant fluid being pumped to the bearing device. A pressure gauge may also be provided, operatively situated between the pump outlet and the filter device to indicate an operative pressure thereat.

The bearing inlet of the bearing housing may be situated at a location radially above the shaft such that the lubricant fluid operatively supplied by the pump will be deposited on top of the shaft. The bearing outlet, on the other hand, may be situated at a location radially below the shaft to define an approximate maximum level of accumulated lubricant fluid to be maintained in the sump. The reservoir may be mounted at a location below the sump such that lubricant fluid flows from the bearing outlet to the reservoir by gravity.

In presently preferred embodiments, the predetermined flow rate through the bearing housing may fall generally within a range of 0.1 through 0.5 gallons per minute (GPM). The pump rate, in contrast, may fall generally in a range of 0.5 through 1.0 GPM.

Other objects of the invention are achieved by a method of providing a lubricant fluid to a hydrodynamic sleeve bearing having a housing defining a sump for maintaining lubricant fluid therein. The bearing housing is further configured to permit flow of the lubricant fluid therethrough at a predetermined flow rate. A first step of the method involves draining the lubricant fluid exceeding a predetermined level from the sump into a reservoir. Lubricant fluid is then pumped from the reservoir at a pump rate exceeding the predetermined flow rate. A first portion of the lubricant fluid as pumped is supplied to the bearing at a rate generally equal to the predetermined flow rate. A second portion of the lubricant fluid as pumped is diverted to the reservoir at a rate generally equal to a difference between the pump rate and the predetermined flow rate. The method may further include the step of filtering the first portion of the lubricant fluid prior to being supplied to the bearing.

Preferably, the first portion of the lubricant fluid is supplied to a location radially above a shaft supported by the bearing such that the lubricant fluid is deposited on top of the shaft. The lubricant fluid may be drained from the sump at a location radially below the shaft.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
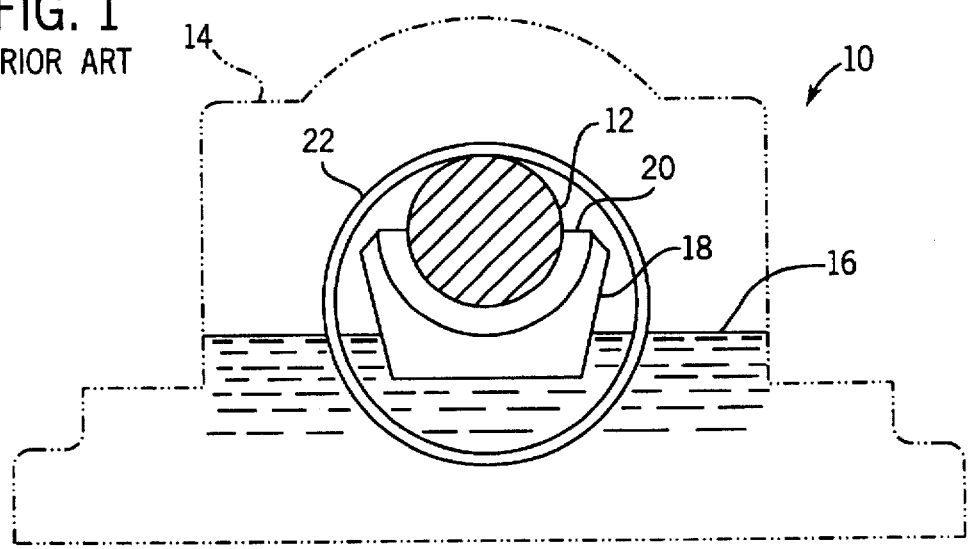
FIG. 1 is a diagrammatic representation of an oil ring arrangement typically utilized in hydrodynamic sleeve bearings of the prior art.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a prior art hydrodynamic sleeve bearing, indicated generally at 10, operatively supporting a mechanical shaft 12. Bearing 10 includes a bearing housing 14 defining a sump for maintaining a lubricant fluid, here oil 16, therein. As is well known, shaft 12 extends through a supporting sleeve structure maintained within housing 14. For purposes of illustration, only a portion 18 of this supporting sleeve structure is shown, including a layer of babbitt metal 20.

As shown, an oil ring 22 extends about shaft 12 into the oil 16 maintained in the sump. Oil ring 22 contacts the top of shaft 12, such that oil ring 22 will also rotate upon rotation of shaft 12. It will be appreciated that the rate of rotation of oil ring 22 will generally be much slower than that of shaft 12. Nevertheless, oil ring 22 will tend to lift oil 16 from the sump and deposit it on top of shaft 12. As a result, a supply of oil is provided to generate the desired oil film within the bearing sleeve.

Figure 2:
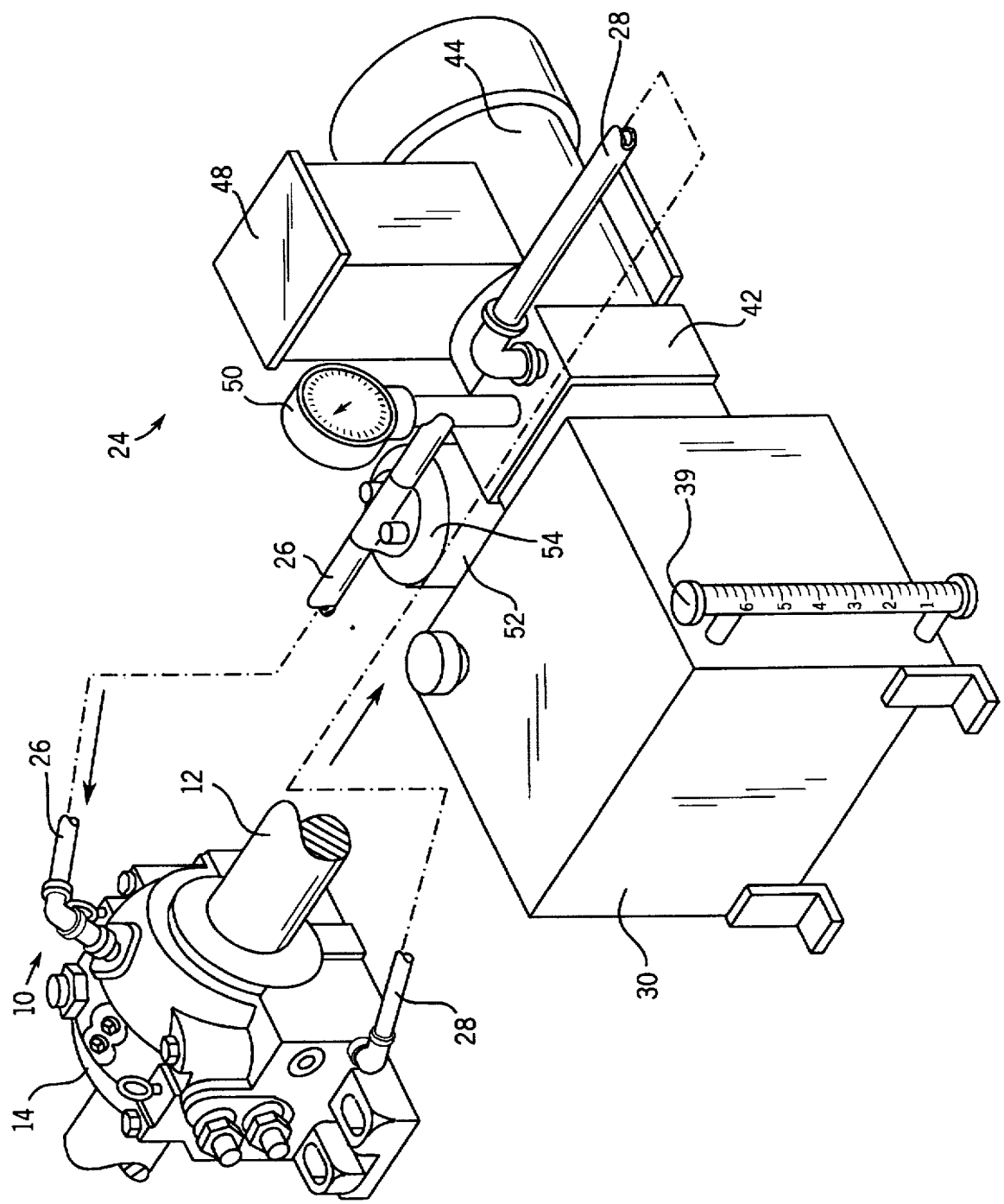
FIG. 2 is a perspective representation of an improved bearing system constructed in accordance with the present invention.

As described above, the use of an oil ring is generally effective to provide an adequate supply of oil to shaft 12. In some circumstances, however, it may be desirable to further supplement the capacity of the oil ring. Thus, FIG. 2 illustrates an improved bearing system constructed in accordance with the present invention. In this case, the bearing 10 has been further supplemented with an integrated and compact lubricant circulation apparatus, indicated generally at 24.

Figure 4:
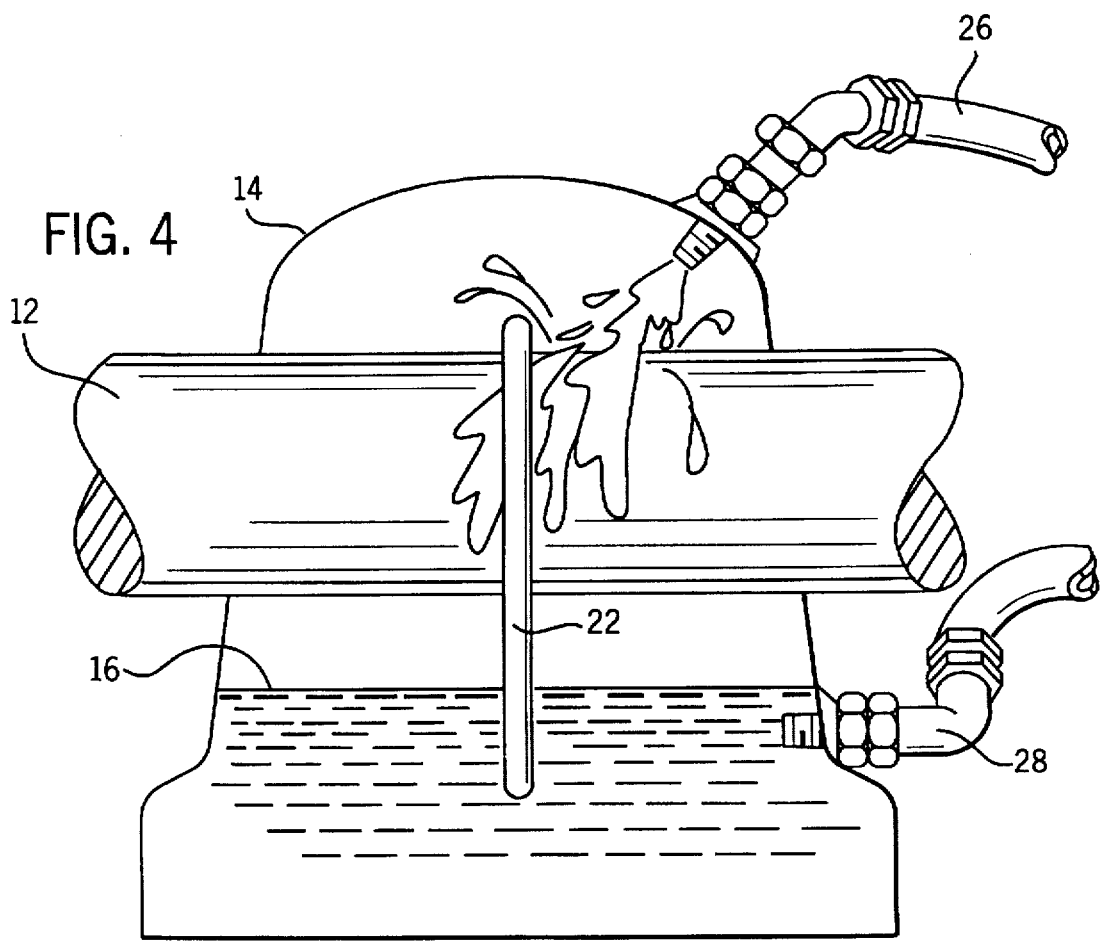
FIG. 4 is a diagrammatic representation illustrating connection of lubricant circulation conduits to the bearing housing in the bearing system of FIG. 2.

Lubricant circulation apparatus 24 includes appropriate fluid conduits 26 and 28 in respective fluid communication with a bearing inlet and a bearing outlet defined in housing 14 of bearing 10. As shown in FIG. 4, the bearing inlet is preferably situated at a location radially above shaft 12 such that the lubricant fluid is deposited on top of shaft 12. The bearing outlet, in contrast, is preferably situated at a location below shaft 12 at approximately the desired level at which accumulated oil is to be maintained in the sump.

Figure 3:
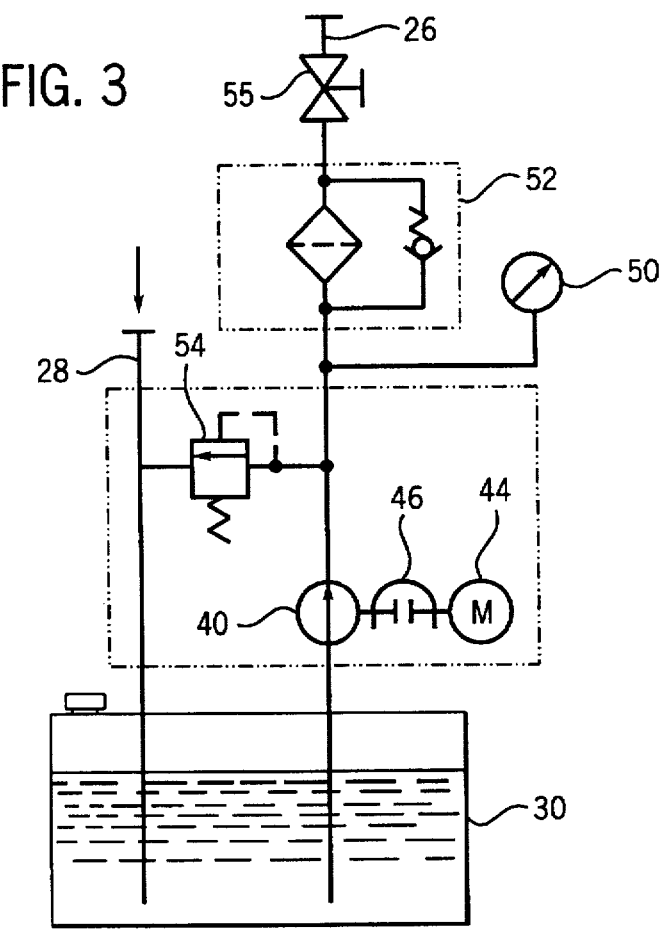
FIG. 3 is a schematic diagram illustrating the operation of a lubricant circulation apparatus utilized in the bearing system of FIG. 2.
Figure 5:
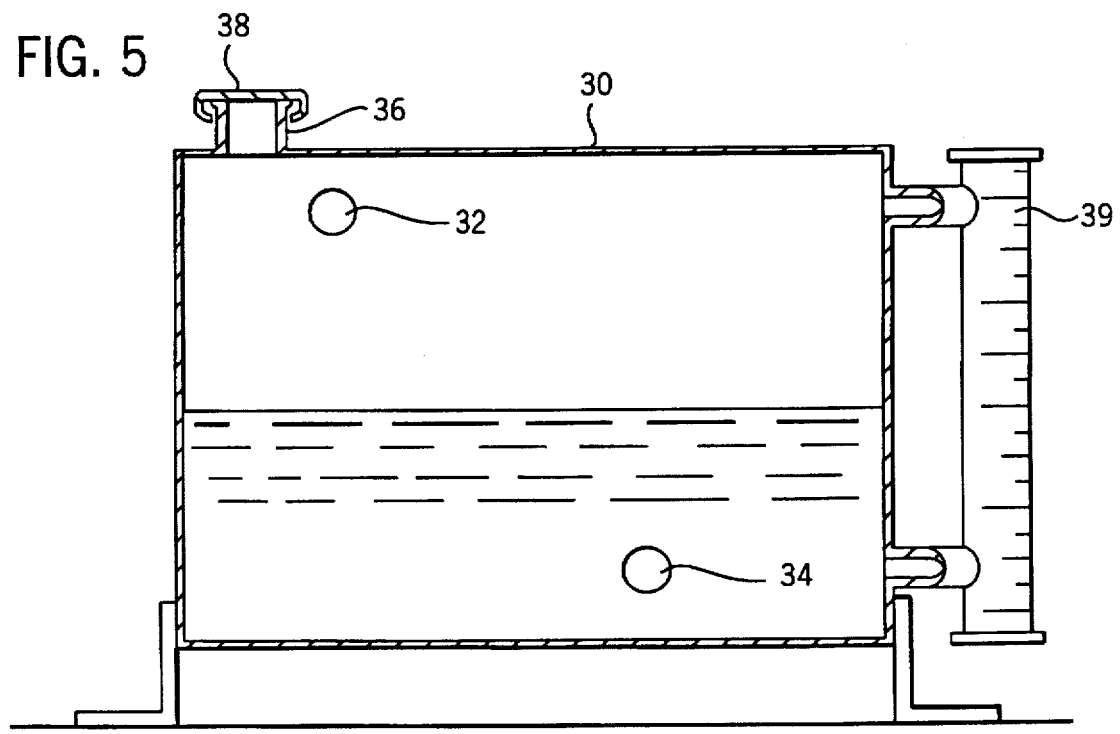
FIG. 5 is a partial cross sectional view illustrating a reservoir such as may be utilized in the lubrication circulation apparatus shown in FIG. 2.

Referring now to FIGS. 2 and 3, the various functional components of lubrication circulation apparatus 24 will be described. Apparatus 24 includes a reservoir 30 for maintaining a quantity of oil 16 therein. As can be seen in FIG. 5, reservoir 30 has a reservoir inlet and a reservoir outlet, respectively indicated at 32 and 34. A small spout 36, covered by a cap 38, is provided to permit access to the interior of reservoir 30 when it becomes necessary to add additional oil. In some presently preferred embodiments, spout 36 and cap 38 function as a breather element to allow air into reservoir 30. In other embodiments, it may be desirable to have a sealed system.

Preferably, reservoir 30 is situated at a location physically below bearing 10 during use so that oil may return by gravity from the bearing sump. As can be seen, reservoir 30 further includes a sight gauge 39 to provide an indication of the level of fluid therein. Other suitable means for providing a fluid level indication, such as a dipstick, may also be used. A sight gauge, however, permits the level to be more readily determined than other such methods.

Referring again to FIGS. 2 and 3, a pump is also provided having a suitable pump mechanism (schematically 40) located within a pump housing 42. In presently preferred embodiments, pump mechanism 40 comprises a gear pump, although other suitable pump mechanisms may also be utilized. In this case, pump mechanism 40 is driven by drive motor 44, such as a suitable electric motor, via coupling 46.

As shown, pump housing 42 defines a pump inlet connected to conduit 28 and a pump outlet connected to conduit 26. A terminal box 48 is provided to contain the electrical contacts and the like through which electrical energy is provided to motor 44.

Apparatus 24 further includes a pressure gauge 50 operative to indicate pressure in conduit 26. A filter 52 is provided to remove impurities in the oil pumped through conduit 26. In this case, filter 52 is a cylindrical hydraulic filter associated with a suitable threaded mount 54. It should be appreciated that various other types of filters may also be used depending on the exigencies of a particular application.

The operation of apparatus 24 can be most easily explained with reference to FIG. 3. Pump mechanism 40 draws oil from reservoir 30 at a known rate of flow. Generally, this flow rate will fall in a range of approximately 0.5 through 1.0 GPM. Pumps having a flow rate falling within this range are readily available on the open market. This flow rate, however, is generally in excess of the typical flow rate that can be pumped through many bearings without causing excess accumulation of lubricant fluid in the sump. Specifically, many typical bearing constructions will allow less than about 0.2 GPM of flow. This flow is limited by the size of the drain hole and the fluid head above the drain hole. Some large bearings can handle flow of 20 GPM or more.

The present invention utilizes a flow diverter mechanism to accomodate this excess flow. Preferably, the flow diverter includes a relief valve (schematically 54) returning the excess flow to the reservoir. A needle valve (schematically 55) allows the user to precisely "tune" the system to the exigencies of a particular application. In this manner, various sump sizes and the like can be accommodated by a single lubricant circulation apparatus. In addition, commercially available pumps can be utilized instead of attempting to provide a pump that precisely matches the flow through a particular bearing.

Pressure gauge 50 provides an indication of the pressure in line 26, preferably behind filter 52. This gives an indication of the condition of filter 52, as well as whether relief valve 54 is operating properly.

It can thus be seen that the present invention provides a bearing system having an improved lubricant circulation apparatus. Preferred embodiments continually provide filtered lubricant fluid to the rotating shaft to augment the capacity of the oil ring. In addition, the apparent sump capacity of the bearing is increased, thus allowing less frequent oil replenishment of leaky bearings.

While preferred embodiments of the invention, and preferred methods of practicing same, have been shown and described, modifications may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A method for providing lubricant fluid to a hydrodynamic sleeve bearing having a housing defining a sump for maintaining a lubricant fluid therein and further configured to permit flow of said lubricant fluid through said housing at a predetermined flow rate, said method comprising the steps of:

(a) draining said lubricant fluid exceeding a predetermined level from said sump into a reservoir, wherein said lubricant fluid is drained from said sump at a location radially below said mechanical shaft;

(b) pumping said lubricant fluid from said reservoir at a pump rate exceeding said predetermined flow rate;

(c) supplying a first portion of said lubricant fluid to said bearing at a rate generally equal to said predetermined flow rate, wherein said first portion of said lubricant fluid is supplied to a location radially above a mechanical shaft supported by said bearing such that said lubricant fluid is deposited on top of said mechanical shaft; and d) diverting a second portion of said lubricant fluid to said reservoir at a rate generally equal to a difference between said pump rate and said predetermined flow rate.

2. A method for providing lubricant fluid to a hydrodynamic sleeve bearing having a housing defining a sump for maintaining a lubricant fluid therein and further configured to permit flow of said lubricant fluid through said housing at a predetermined flow rate falling generally in a range of 0.1 through 0.5 GPM, said method comprising the steps of:

(a) draining said lubricant fluid exceeding a predetermined level from said sump into a reservoir;

(b) pumping said lubricant fluid from said reservoir at a pump rate exceeding said predetermined flow rate, said pump rate falling generally in a range of 0.5 through 1.0 GPM;

(c) supplying a first portion of said lubricant fluid to said bearing at a rate generally equal to said predetermined flow rate; and (d) diverting a second portion of said lubricant fluid to said reservoir at a rate generally equal to a difference between said pump rate and said predetermined flow rate.

3. A bearing system for facilitating rotation of a mechanical shaft, said system comprising:

a bearing device having a housing defining a bore therein for receipt of said mechanical shaft, said bearing device operative to support said mechanical shaft during rotation thereof;

said bearing housing defining a sump for maintaining a lubricant fluid therein, said bearing housing further defining a bearing inlet and a bearing outlet permitting flow of lubricant fluid through said bearing housing at a predetermined flow rate;

a reservoir in fluid communication with said bearing outlet such that said lubricant fluid will flow from said sump to said reservoir, said reservoir configured to maintain therein a quantity of lubricant fluid;

a pump having a pump housing defining a pump inlet in fluid communication with said reservoir and a pump outlet in fluid communication with said sump, said pump operative to draw lubricant fluid through the pump housing at a pump rate exceeding said predetermined flow rate through said bearing housing;

a diverter mechanism configured to divert back to said reservoir an excess flow from said pump exceeding said predetermined flow rate through said bearing housing;

a filter device operatively situated between said pump outlet and said sump to filter impurities from said lubricant fluid delivered to said bearing device; and a pressure gauge operatively situated between said pump outlet and said filter device to indicate an operative pressure thereat.

4. A bearing system for facilitating rotation of a mechanical shaft, said system comprising:

a bearing device having a housing defining a bore therein for receipt of said mechanical shaft, said bearing device operative to support said mechanical shaft during rotation thereof, said bearing device being a hydrodynamic sleeve bearing including an oil ring extending about said shaft;

said bearing housing defining a sump for maintaining a lubricant fluid therein, said bearing housing further defining a bearing inlet and a bearing outlet permitting flow of lubricant fluid through said bearing housing at a predetermined flow rate;

a reservoir in fluid communication with said bearing outlet such that said lubricant fluid will flow from said sump to said reservoir, said reservoir configured to maintain therein a quantity of lubricant fluid;

a pump having a pump housing defining a pump inlet in fluid communication with said reservoir and a pump outlet in fluid communication with said sump, said pump operative to draw lubricant fluid through the pump housing at a pump rate exceeding said predetermined flow rate through said bearing housing; and a diverter mechanism configured to divert back to said reservoir an excess flow from said pump exceeding said predetermined flow rate through said bearing housing.

5. A bearing system for facilitating rotation of a mechanical shaft, said system comprising:

a bearing device having a housing defining a bore therein for receipt of said mechanical shaft, said bearing device operative to support said mechanical shaft during rotation thereof;

said bearing housing defining a sump for maintaining a lubricant fluid therein, said bearing housing further defining a bearing inlet and a bearing outlet permitting flow of lubricant fluid through said bearing housing at a predetermined flow rate;

a reservoir in fluid communication with said bearing outlet such that said lubricant fluid will flow from said sump to said reservoir, said reservoir configured to maintain therein a quantity of lubricant fluid;

a pump having a pump housing defining a pump inlet in fluid communication with said reservoir and a pump outlet in fluid communication with said sump, said pump operative to draw lubricant fluid through the pump housing at a pump rate exceeding said predetermined flow rate through said bearing housing;

a diverter mechanism configured to divert back to said reservoir an excess flow from said pump exceeding said predetermined flow rate through said bearing housing; and wherein said bearing inlet is situated at a location radially above said mechanical shaft such that said lubricant fluid operatively supplied by said pump will be deposited on top of said mechanical shaft and further wherein said bearing outlet is situated at a location radially below said mechanical shaft to define an approximate maximum level of accumulated lubricant fluid to be maintained in said sump.

6. A system as set forth in claim 5, wherein said reservoir is mounted at a location below said sump such that said lubricant fluid flows from said bearing outlet to said reservoir by gravity.

7. A bearing system for facilitating rotation of a mechanical shaft, said system comprising:

a bearing device having a housing defining a bore therein for receipt of said mechanical shaft, said bearing device operative to support said mechanical shaft during rotation thereof;

said bearing housing defining a sump for maintaining a lubricant fluid therein, said bearing housing further defining a bearing inlet and a bearing outlet permitting flow of lubricant fluid through said bearing housing at a predetermined flow rate falling generally in a range of 0.1 through 0.5 GPM;

a reservoir in fluid communication with said bearing outlet such that said lubricant fluid will flow from said sump to said reservoir, said reservoir configured to maintain therein a quantity of lubricant fluid;

a pump having a pump housing defining a pump inlet in fluid communication with said reservoir and a pump outlet in fluid communication with said sump, said pump operative to draw lubricant fluid through the pump housing at a pump rate exceeding said predetermined flow rate through said bearing housing, said pump rate falling generally in a range of 0.5 through 1.0 GPM; and a diverter mechanism configured to divert back to said reservoir an excess flow from said pump exceeding said predetermined flow rate through said bearing housing.

8. A bearing system for facilitating rotation of a mechanical shaft, said system comprising:

a bearing device having a housing defining a bore therein for receipt of said mechanical shaft, said bearing device operative to support said mechanical shaft during rotation thereof;

said bearing housing defining a sump for maintaining a lubricant fluid therein, said bearing housing further defining a bearing inlet and a bearing outlet permitting flow of lubricant fluid through said bearing housing;

a reservoir in fluid communication with said bearing outlet such that said lubricant fluid will flow from said sump to said reservoir, said reservoir configured to maintain therein a quantity of lubricant fluid;

a pump having a pump housing defining a pump inlet in fluid communication with said reservoir and a pump outlet in fluid communication with said sump, said pump operative to draw lubricant fluid through the pump housing;

a filter device operatively situated between said pump outlet and sump to filter impurities from said lubricant fluid delivered to said bearing device; and wherein said bearing inlet is situated at a location radially above said mechanical shaft such that said lubricant fluid operatively supplied by said pump will be deposited on top of said mechanical shaft, and further wherein said bearing outlet is situated at a location radially below said mechanical shaft to define an approximate maximum level of accumulated lubricant fluid to be maintained in said sump.

9. A system as set forth in claim 8, wherein said pump is operative at a pump rate falling generally in a range of 0.5 through 1.0 GPM.

10. A system as set forth in claim 8, wherein said reservoir is mounted at a location below said sump such that said lubricant fluid flows from said bearing outlet to said reservoir by gravity.

* * * * *